United States Patent [19]

Matsumoto et al.

[11] Patent Number: 5,073,528
[45] Date of Patent: Dec. 17, 1991

[54] DIELECTRIC CERAMIC AND PROCESS FOR PRODUCING THE SAME

[75] Inventors: Kazutoshi Matsumoto, Matsudo; Takehiro Hyuga, Ishikawa; Tetsuya Mukai, Matsudo all of Japan

[73] Assignee: Sumitomo Metal Mining Co., Ltd., Tokyo, Japan

[21] Appl. No.: 530,213

[22] Filed: May 30, 1990

[30] Foreign Application Priority Data

May 30, 1989 [JP] Japan ................. 1-136679

[51] Int. Cl.⁵ ............ C04B 35/46; C04B 35/48; C04B 35/49
[52] U.S. Cl. ................. 501/134; 501/135; 264/65; 264/66
[58] Field of Search ........... 501/134, 136, 137, 135; 264/64, 65, 66

[56] References Cited

U.S. PATENT DOCUMENTS 4,731,207 3/1988 Matsumoto et al. ........... 264/25

FOREIGN PATENT DOCUMENTS 095338 11/1983 European Pat. Off.
62-217504 9/1987 Japan.
62-252008 11/1987 Japan.
64-60905 3/1989 Japan.

OTHER PUBLICATIONS

S. Kawashima et al., "Ba(Zn$_{\frac{1}{3}}$Ta$_{\frac{2}{3}}$)O$_3$ Ceramics with Low Dielectric Loss at Microwave Frequencies", Journal of the American Ceramic Society, vol. 66, No. 6, 1983, pp. 421-423.

Primary Examiner—William R. Dixon, Jr.
Assistant Examiner—Michael A. Marcheschi
Attorney, Agent, or Firm—Foley & Lardner

[57] ABSTRACT

Dielectric ceramic and process of producing the same. A dielectric ceramic essentially consisting of a compound having a disordered perovskite-type complex crystal structure and having a composition represented by the general formula (I):

$$Ba_xA_yB_{1-x-y}O_H \qquad (I)$$

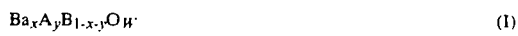

wherein A represents at least one element selected from the group consisting of Zn, Ni, Co and Mg, and the Mg content in the A is not more than 0.44y; B is at least one element selected from the group consisting of Ta and Nb; x and y are a number of $0.49 \leq x \leq 0.52$ and $0.15 \leq y \leq 0.19$, respectively. This dielectric ceramic has good dielectric properties, which are markedly small in variation, and can be produced by a process which is easy in control.

6 Claims, 2 Drawing Sheets

Angle of diffraction 2θ

DIELECTRIC CERAMIC AND PROCESS FOR PRODUCING THE SAME

BACKGROUND OF THE INVENTION

1. Field of the Invention

The present invention relates to a dielectric ceramic and process for producing the same, in particular to a dielectric ceramic with a high relative dielectric constant, a high unloaded Q and stable temperature properties and a process capable of producing the same.

2. Description of the Prior Art

In general, it is desired to use dielectric ceramics with a high relative dielectric constant, a high unloaded Q and stable temperature characteristics for dielectric resonator systems and dielectric substrates used in signal circuits for high frequency zones such as micro wave and milimeter wave.

It is known that the unloaded Q of $Ba(Zn_{1/3}Ta_{2/3})O_3$ dielectric ceramics varies in the wide range of from 500 to 14,000 depending on the length of heat-treating time at 1,350° C. (S. Kawashima et al., "$Ba(Zn_{1/3}Ta_{2/3})O_3$ Ceramics with Low Dielectric Loss at Microwave Frequencies", Journal of the American Ceramics Society, vol. 66, pp 421–423 (1983)). Japanese Pre-examination Patent Publication (KOKAI) No. 252008/1987 describes that the unloaded Q varies in the wide range of from 2,000 to 14,000 depending on the kind of atmosphere. Moreover, the present inventors have confirmed that not only unloaded Q but also relative dielectric constant and the temperature coefficient of resonant frequency vary depending on the time of heat treatment for firing.

As described above, since the properties of a dielectric ceramic are affected greatly by production conditions, particularly by the time of heat treatment and an atmosphere according to conventional production processes, the products having a large variation in the properties are likely to be produced. Therefore, the production process, especially the time of heat treatment and an atmosphere, needs to be controlled strictly in order to produce a dielectric ceramic with good dielectric properties. It is not easy, however, to conduct process control completely all the time, resulting in an unsatisfactory low yield of dielectric ceramics with desired dielectric properties. Accordingly, a production process has been required that is easy in process control and capable of producing dielectric ceramics having good dielectric properties in a good yield.

It is known that the difference of resulting dielectric properties according to the difference of heat treating time or an atmosphere is caused by the degree of order of crystal structure (mainly, order degree of B site ion in the structure $A(B'B'')O_3$). Heretofore, it has been thought that unloaded Q is enhanced with increase in the order; therefore, dielectric ceramics with an ordered crystal structure have been predominantly researched and developed, but dielectric ceramics with a disordered crystal structure have not drawn attention.

The U.S. Pat. No. 4,731,207 discloses a process comprising the step of heating a green compact composed of a calcined product having a composition represented by the formula:

wherein x, y and z satisfy $0.5 \leq x \leq 0.7$, $0.1523 \leq y \leq 0.25$, $0.15 \leq z \leq 0.25$, and $x+y+z=1$, at a rate of from 100 to 1,600° C./min. up to a temperature of from 1,500 to 1,700° C., and subsequently retaining the green compact at the temperature for not less than 30 minutes. This process can produce dielectric ceramics with a fairly high unloaded Q; however, a long time is required for heat-treatment after the rapid heating step. Since the unloaded Q tends to be increased with lapse of time of heat-treatment, the ceramic with the composition of the above formula is presumably improved in unloaded Q with increase of degree of order in its crystal structure. The ceramic prepared by this process has a dielectric constant of about 25. Recently, dielectiric ceramics with a higher dielectric constant are required.

SUMMARY OF THE INVENTION

Accordingly, it is an object of the present invention to provide a dielectric ceramic with a good relative dielectric constant, unloaded Q and temperature characteristics, and a process with easy control for producing the same stably, i.e., with a markedly small variation in the properties.

Thus, the present invention provides, as a means achieving the object, a dielectric ceramic essentially consisting of a compound having a disordered perovskitetype complex crystal structure and having a composition represented by the general formula (I):

$$Ba_xA_yB_{1-y}O_w \qquad (I)$$

wherein A represents at least one element selected from the group consisting of Zn, Ni, Co and Mg, and the Mg content in the A is not more than 0.44y; B is at least one element selected from the group consisting of Ta and Nb; x and y are a number of $0.49 \leq x \leq 0.52$ and $0.15 \leq y \leq 0.19$, respectively; w is a number that neutralizes the total electric charge of cations Ba, A and B so that the ceramic may be neutral electrically as a whole.

The dielectric ceramic of the present invention has a good relative dielectric constant, a good unloaded Q and a stable temperature characteristics, and these properties are markedly small in variation. Further, the ceramic can be produced by the process described later as those having stable identical properties without being affected by heat-treating time at firing or the kind of an atmosphere. The process is excellent in easiness of process control as compared with the conventional processes.

DETAILED DESCRIPTION OF PREFERRED EMBODIMENTS

In the above general formula (I), if x, y or the Mg content is outside the range as specified above, the dielectric ceramic obtained does not exhibit a suitable relative dielectric constant, unloaded Q or temperature characteristics as a resonator. In the general formula (I), preferably, x is from 0.49 to 0.52, and y is from 0.16 to 0.19. The symbol w represents a number such that the cations constituting the ceramic are neutralized electrically, as described above, and normally in a range of from $(5/2)-(3x/2)-(3y/2)$ to $(5/2)-(3x/2)-y$, more specifically from 1.43 to 1.63. Preferably, Zn content in the A is preferably 0.29y or more.

Figure 1:
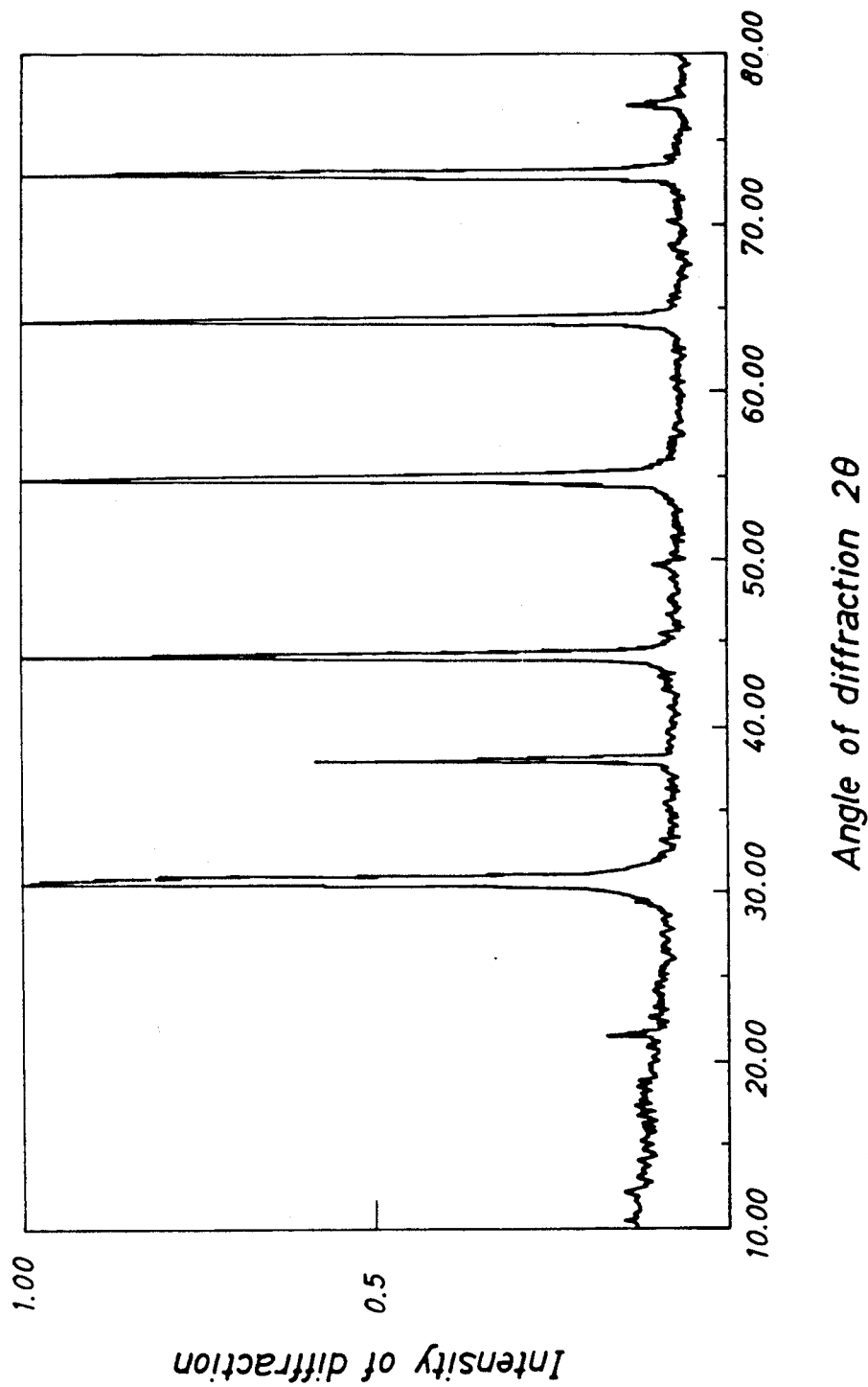
FIG. 1 and FIG. 2 show an X-ray diffraction pattern of a dielectric ceramic of a working example of the present invention and one of a comparative example, respectively.
Figure 2:
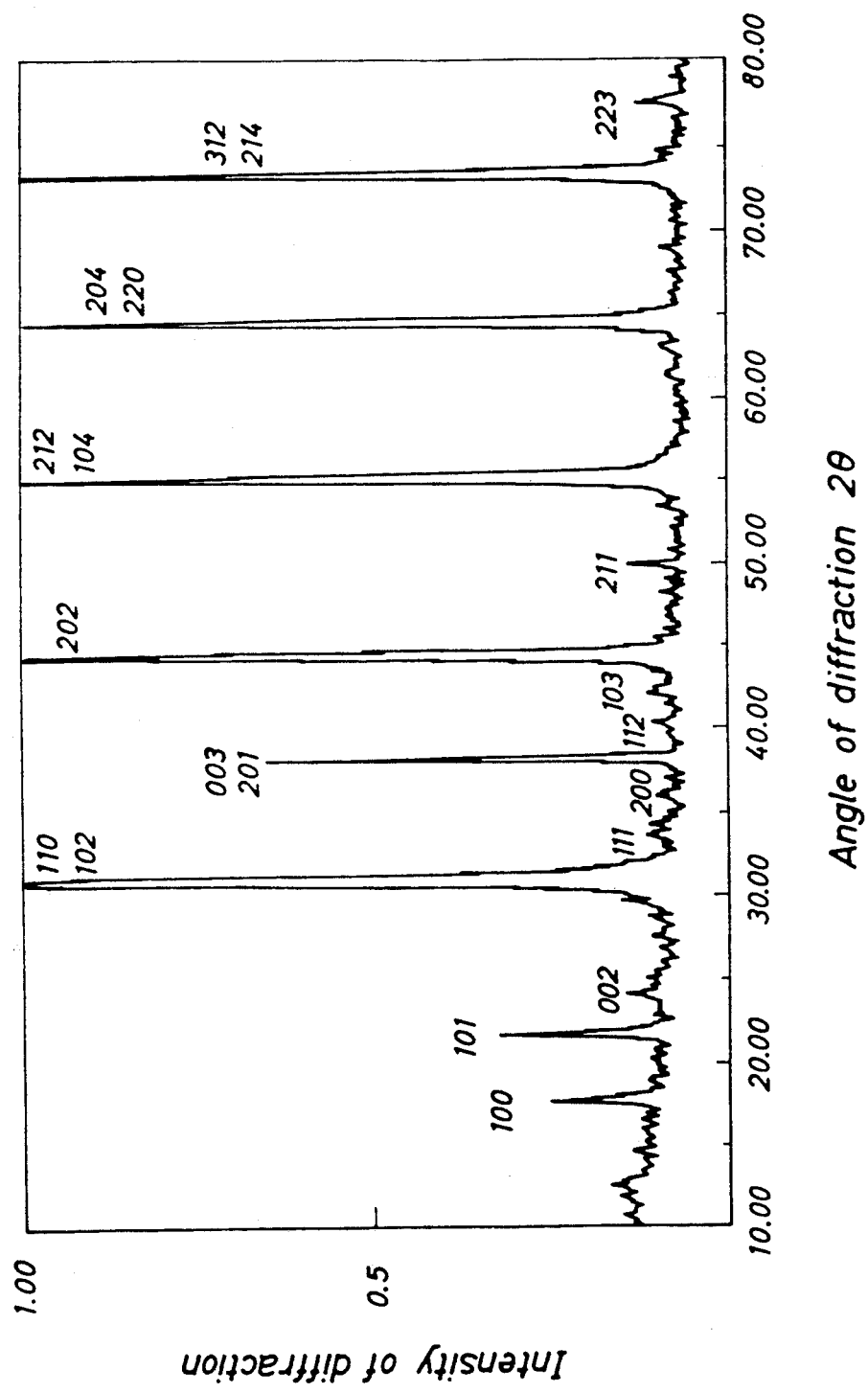

The term "disordered crystal structure" herein means a perovskite type complex crystal structure of which degree of disorder defined by the equation below is 0.4 or less, preferably 0.25 or less. The terminology "ordered crystal structure" herein means a perovskite type crystal structure of which degree of order is more than 0.4.

$$\text{Degree of order} = \frac{\dfrac{(100) \text{ plane diffraction intensity } A}{\text{Total of diffraction intensities } A \text{ of } (110) \text{ plane and } (102) \text{ plane}}}{\dfrac{(100) \text{ plane diffraction intensity } B}{\text{Total of diffraction intensities } B \text{ of } (110) \text{ plane and } (102) \text{ plane}}}$$

wherein (100), (110) and (102) are plane indices of the hexagonal system applied to a X-ray diffraction pattern exemplified by FIGS. 1 and 2; and the diffraction intensity A is that of a ceramic to be measured and the diffraction intensity B is that of a ceramic with a completely ordered structure.

The dielectric ceramic of the present invention can be produced, for example, by a process comprising the steps of:

calcining a mixture of compounds selected from the group consisting of oxides and compounds of the metals constituting said compound of the general formula (I) which are converted into oxides under the heating conditions of this calcining step or the firing step below, at a temperature of from 900 to 1,400° C, and firing by heating the calcined product thus obtained at a rate of from 100° C to 1,600° C/min. up to a temperature of the order-disorder transition temperature of said intended compound of the general formula (I) or above, and maintaining the calcined product at the temperature for at least 2 minutes.

The raw material compounds used as sources of the constituent metals include, for example, oxides as well as all sorts of compounds which can be converted into oxides under the conditions of the calcining or firing step, and specifically include, generally, hydroxides and carbonates. Examples of such compounds include barium carbonate, magnesium oxide, zinc oxide, nickel oxide, cobalt oxide, tantalum oxides such as tantalum pentaoxide, and niobium oxides such as niobium, pentaxide. As conventionally conducted, suitable powdery metal compounds may be selected from the above compounds, weighed and mixed at a desired proportion according to an intended specific composition of the general formula (I), and dried, followed by the firing step. The proportion of the starting materials is preferably set with consideration of easiness or hardness in evaporation of individual components, as conventionally performed. The calcination may be carried out normally at from 900 to 1,400° C, preferably at 1,000 to 1,200° C.

The calcined product obtained is subjected to the firing step. It may be ground, graded and/or press-molded if required, and thereafter subjected to firing. Firing is carried out by heating the calcined product at a rate of from 100 to 1,600° C/minute up to a temperature of the order-disorder transition temperature of said intended compound of the general formula (I) or above, and maintaining the temperature for at least 2 minutes, preferably from about 2 minutes to 1 hour. Such firing time can provide a ceramic with good and stable properties in a good yield. The dielectric properties of the ceramic obtained do not vary according to the length of firing time.

The order-disorder transition temperature is different depending on the composition of an intended ceramic, and it varies generally from 1,350 to 1,600° C. The order-disorder transition temperature of a ceramic to be produced can be determined readily by experiments using X-ray diffractometry, thermal analysis, etc. After heated up rapidly, the calcined product must be fired at a temperature of not less than the order-disorder transition temperature thus determined, and practically in a range of from 1,500 to 1,700° C. Firing at too high a temperature results in waste of energy and therefore is disadvantageous. If firing after rapid heating is carried out below the order-disorder transition temperature, the dielectric properties such as unloaded Q of a resulting ceramic vary largely depending on the length of firing time; hence process control is hard.

The atmosphere in which the above process is carried out is not particularly limited, and may any of oxidizing atmosphere such as oxygen and air, and inert atmosphere such as nitrogen. Hence, normally air can be used satisfactorily, and no special control is needed. Aids for promoting sintering, such as Mn and Li, or a trace of metal elements for replacement such as Sb, Zr, Ti and Vd, or anions such as chloride may be added, as long as the composition of the general formula (I) is substantially retained.

EXAMPLES

The present invention will now be described in more detail with reference to working examples of the present invention and comparative examples.

EXAMPLE 1

As starting materials, from powders of barium carbonate, zinc oxide, magnesium oxide, nickel oxide, cobalt oxide, niobium oxide, and tantalum oxide, each having a purity of 99.9 % by weight, necessary powders were selected, weighed, and blended to give various test samples with a composition as given in Table 1 (Note: x and y in Table 1 are as defined in respect of said general formula (I)). The test samples were each placed in a ball mill pot together with pure water and wet mixed with resin coated balls for 16 hours. The resulting mixture was taken out of the pot, dried at 150° C. for 3 hours, and then calcined in oxygen at 1,000–1,200° C. for 2 hours. The resulting calcined mixture was ground into particles, which were graded by passing through a sieve of 42 mesh; thus the particle size thereof were made uniform. The resulting powder was primarily molded into a disc with a diameter of 10 mm and a thickness of about 5 mm under a pressure of 500 kg/cm: in a mold, and the disc was then pressed under a pressure of 2,000 kg/cm² using a hydrostatic press to give a press-molded product. Subsequently, the molded products thus obtained from the test samples were each heated at a rate of from 100 to 1,600° C/min. to a temperature of from 1,500 to 1,700° C, at which the molded products were maintained within 4 hours, thereby dielectric ceramics being obtained. The dielectric ceramic was worked into a disk with a diameter of about 6 mm and a height of about 3 mm, and was subjected to measurement of relative dielectric constant ($\epsilon_r$), unloaded Q (Qu) and temperature coefficient of resonant frequency ($\tau_f$) according to the Dielectric Rod Resonator Method. The results obtained are given in Table 1.

The dielectric ceramics prepared were subjected to X-ray diffractometry in attempt to identify the crystal structure. All of the ceramics exhibited X-ray diffraction patterns similar to the pattern of a disordered perovskite-type complex crystal structure represented by $Ba(Zn_{1/3}Nb_{2/3})O_3$. The X-ray diffraction pattern measured for the ceramic of Test Sample No. 104 is shown in FIG. 1.

The dielectric ceramics were heat-treated at a temperature below their order-disorder transition temperature, and then subjected to X-ray diffractometry. After the heat-treatment, all the ceramics exhibited an X-ray diffraction pattern similar to the pattern of an ordered perovskite-type complex crystal structure represented by $Ba(Zn_{1/3}Ta_{2/3})O_3$. For example, the ceramic of Test Sample No. 104 exhibited the X-ray diffraction pattern as shown in FIG. 2 after heat-treatment at 1,450° C., which is below its order-disorder transition temperature of 1,600° C., for 4 hours.

The results given in Table 1 show that the dielectric ceramics of the present invention have excellent dielectric properties, i.e., 28 or more in relative dielectric constant; 8,000 or more, especially from 18,000 to 19,000 in the preferred embodiments, in unloaded Q; and within ±10 ppm, especially within ±4 ppm in the preferred embodiments, in temperature coefficient of resonant frequencies.

In each of the groups of Test Sample Nos. 105 and 106; Nos. 114, 115 and 116; and Nos. 117, 118 and 119, the ceramics were produced under the same conditions except for the length of heat-treating time. The results obtained therefor show that relative dielectric constant and temperature coefficient of resonant frequencies did not change at all depending on the length of heat-treating time. It should be noted that the products of this invention have very small variation in temperature characteristics of resonant frequencies, which indicates high reliability of the dielectric ceramics of this invention.

TABLE 1

| Test Sample No. | Composition | | | | | | | Heating rate °C./min. | Temperature °C. | Time min. | $\epsilon r$ | Qu × $10^2$ | $\tau f$ ppm/°C. |
|---|---|---|---|---|---|---|---|---|---|---|---|---|---|
| | x Ba | y Zn | Mg | Co | Ni | 1-x-y Ta | Nb | | | | | | |
| 101 | 0.5 | 0.05 | 0 | 0.05 | 0.06 | 0.1 | 0.24 | 100 | 1500 | 15 | 28 | 100 | 1 |
| 102 | 0.51 | 0.05 | 0.07 | 0.01 | 0.03 | 0.13 | 0.2 | 500 | 1500 | 20 | 30 | 110 | 9 |
| 103 | 0.5 | 0.07 | 0 | 0.05 | 0.05 | 0.1 | 0.23 | 600 | 1650 | 5 | 33 | 80 | 9 |
| 104 | 0.5 | 0.1 | 0 | 0.03 | 0.04 | 0.22 | 0.11 | 1000 | 1500 | 30 | 30 | 110 | −1 |
| 105 | 0.5 | 0.07 | 0 | 0.05 | 0.05 | 0.1 | 0.23 | 1000 | 1600 | 4 | 33 | 100 | 3 |
| 106 | 0.5 | 0.07 | 0 | 0.05 | 0.05 | 0.1 | 0.23 | 1000 | 1600 | 5 | 33 | 100 | 3 |
| 107 | 0.49 | 0.06 | 0.02 | 0.05 | 0.05 | 0.22 | 0.11 | 1000 | 1600 | 5 | 29 | 110 | −3 |
| 108 | 0.5 | 0.07 | 0.06 | 0.02 | 0.02 | 0.25 | 0.08 | 1000 | 1600 | 20 | 28 | 170 | 2 |
| 109 | 0.49 | 0.07 | 0.07 | 0.02 | 0.03 | 0.2 | 0.12 | 1000 | 1650 | 3 | 29 | 150 | 5 |
| 110 | 0.52 | 0.07 | 0.06 | 0.02 | 0 | 0.1 | 0.23 | 1000 | 1650 | 5 | 32 | 130 | 9 |
| 111 | 0.5 | 0.08 | 0.07 | 0 | 0.02 | 0.2 | 0.13 | 1000 | 1700 | 1 | 28 | 150 | 9 |
| 112 | 0.5 | 0.07 | 0 | 0.05 | 0.05 | 0.1 | 0.23 | 1600 | 1500 | 10 | 33 | 100 | 3 |
| 113 | 0.5 | 0.07 | 0.06 | 0.02 | 0.02 | 0.25 | 0.08 | 1600 | 1600 | 6 | 28 | 170 | 2 |
| 114 | 0.5 | 0.07 | 0.06 | 0.02 | 0.02 | 0.25 | 0.08 | 800 | 1500 | 5 | 30 | 190 | 4 |
| 115 | 0.5 | 0.07 | 0.06 | 0.02 | 0.02 | 0.25 | 0.08 | 800 | 1500 | 60 | 30 | 185 | 4 |
| 116 | 0.5 | 0.07 | 0.06 | 0.02 | 0.02 | 0.25 | 0.08 | 800 | 1500 | 240 | 30 | 170 | 4 |
| 117 | 0.5 | 0.05 | 0.06 | 0.03 | 0.03 | 0.23 | 0.10 | 1000 | 1500 | 5 | 29 | 170 | 3 |
| 118 | 0.5 | 0.05 | 0.06 | 0.03 | 0.03 | 0.23 | 0.10 | 1000 | 1500 | 60 | 29 | 170 | 3 |
| 119 | 0.5 | 0.05 | 0.06 | 0.03 | 0.03 | 0.23 | 0.10 | 1000 | 1500 | 240 | 29 | 165 | 3 |
| 120 | 0.5 | 0.07 | 0.06 | 0.02 | 0.02 | 0.25 | 0.08 | 800 | 1650 | 10 | 29 | 190 | 2 |
| 121 | 0.5 | 0.07 | 0.06 | 0.02 | 0.02 | 0.25 | 0.08 | 1000 | 1600 | 5 | 28 | 170 | 2 |

COMPARATIVE EXAMPLE 1

As starting materials, powders of barium carbonate, zinc oxide, magnesium oxide, nickel oxide, cobalt oxide, niobium oxide, and tantalum oxide, each having a purity of 99.9 % by weight, were weighed and blended to give the compositions of Test Sample Nos. 201-213 as given in Table 2 (Note: x and y in Table 2 are as defined in respect of said general formula (I)). Subsequently, dielectric ceramics were produced from each composition in the same manner as in Example 1, except that heating rate, firing temperature and firing time were set as given in Table 2. The ceramics obtained were tested in the same manner as in Example 1. The results obtained are given in Table 2.

TABLE 2

| Test Sample No. | Composition | | | | | | | Heating rate °C./min. | Firing temperature °C. | Firing time min | $\epsilon r$ | Qu × $10^2$ | $\tau f$ ppm/°C. | Remarks |
|---|---|---|---|---|---|---|---|---|---|---|---|---|---|---|
| | x Ba | y Zn | Mg | Co | Ni | 1-x-y Ta | Nb | | | | | | | |
| 201 | 0.53 | 0.07 | 0.07 | 0.02 | 0.01 | 0.1 | 0.2 | 600 | 1600 | 15 | 33 | 50 | 18 | |
| 202 | 0.48 | 0.07 | 0.07 | 0.02 | 0.01 | 0.1 | 0.25 | 600 | 1600 | 15 | 31 | 58 | 19 | |
| 203 | 0.5 | 0.03 | 0.03 | 0.07 | 0.07 | 0.28 | 0.02 | 600 | 1600 | 15 | 23 | 80 | −12 | |
| 204 | 0.51 | 0.01 | 0.01 | 0.06 | 0.06 | 0.3 | 0.05 | 600 | 1600 | 15 | 24 | 65 | −11 | |
| 205 | 0.5 | 0.07 | 0.07 | 0.015 | 0.145 | 0.1 | 0.1 | 80 | 1650 | 15 | — | — | — | not resonated |
| 206 | 0.5 | 0.07 | 0.07 | 0.015 | 0.145 | 0.1 | 0.1 | 1800 | 1650 | 15 | — | — | — | The ceramic cracked. |
| 207 | 0.5 | 0.07 | 0.07 | 0.015 | 0.145 | 0.1 | 0.1 | 600 | 1400 | 15 | 20 | 10 | 5 | |
| 208 | 0.5 | 0.07 | 0.07 | 0.015 | 0.145 | 0.1 | 0.1 | 600 | 1800 | 15 | 33 | 30 | 10 | |
| 209 | 0.5 | 0.07 | 0.07 | 0.015 | 0.145 | 0.1 | 0.1 | 600 | 1700 | 40 | 31 | 50 | 9 | |
| 210 | 0.51 | 0.06 | 0.06 | 0.02 | 0.03 | 0.2 | 0.12 | 60 | 1700 | 25 | 18 | 12 | 4 | |
| 211 | 0.51 | 0.06 | 0.06 | 0.02 | 0.03 | 0.2 | 0.12 | 2000 | 1700 | 10 | — | — | — | The ceramic cracked. |
| 212 | 0.51 | 0.06 | 0.06 | 0.02 | 0.03 | 0.2 | 0.12 | 1000 | 1400 | 5 | 23 | 60 | 3 | |

TABLE 2-continued

| Test Sample No | Composition x Ba | y Zn | Mg | Co | Ni | 1-x-y Ta | Nb | Heating rate °C./min | Firing temperature °C | Firing time min | $\epsilon_r$ | Qu × $10^2$ | $\tau f$ ppm/°C | Remarks |
|---|---|---|---|---|---|---|---|---|---|---|---|---|---|---|
| 213 | 0.51 | 0.06 | 0.06 | 0.02 | 0.03 | 0.2 | 0.12 | 1000 | 1450 | 15 | 34 | 50 | | b |

COMPARATIVE EXAMPLE 2

As starting materials, powders of barium carbonate, zinc oxide, magnesium oxide, nickel oxide, cobalt oxide, niobium oxide, and tantalum oxide, each having a purity of 99.9% by weight, were weighed and blended to give the compositions of Test Sample Nos. 301-306 as given in Table 3 (Note: x and y in Table 3 are as defined in respect of the general formula (I)). The composition of Test Sample Nos. 301-303 are common to that of Test Sample Nos. 114-116 in Example 1, and the composition of Test Sample Nos. 304-306 are common to that of Test Sample Nos. 117-119 in Example 1. The composition of each test sample was mixed, dried, calcined, and press-molded in the same manner as in Example 1. The press-molded products were sintered once at 1,600° C, and thereafter were heat-treated at 1,400° C, which is below its order-disorder transition temperature (1,450° C. or more), for 5 to 240 minutes to produce dielectric ceramics. The ceramics obtained were tested in the same manner as in Example 1. The results obtained are given in Table 3.

The dielectric ceramics were subjected to X-ray diffractometry in attempt to identify crystal phases. All of the ceramics exhibited an X-ray diffraction pattern similar to the pattern of an ordered perovskite-type complex crystal structure represented by $Ba(Zn_{1/3}Ta_{2/3})O_3$.

The results in Table 3 show that in both cases of Test Sample Nos. 301-303 and Test Sample Nos. 304-306, either of relative dielectric constant, unloaded Q and temperature coefficient of resonant frequencies changes with increase in time of heat-treatment. Particularly, the change in temperature coefficient changed largely, indicating that the product dielectric ceramics have a considerable variation in temperature characteristics of resonant frequencies.

plex crystal structure and having a composition represented by the general formula (I):

$$Ba_xA_yB_{1-x-y}O_w \quad \text{(I)}$$

wherein A represents at least one element selected from the group consisting of Zn, Ni, Co and Mg, and the Mg content in the A is not more than 0.44y; B is at least one element selected from the group consisting of Ta and Nb; x and y are a number of $0.49 \leq x \leq 0.52$ and $0.15 \leq y \leq 0.19$, respectively; w is a number that neutralizes the total electric charge of cations Ba, A and B so that the ceramic may be neutral electrically as a whole.

2. The ceramic of claim 1, wherein x and y in the general formula (I) represent a number of $0.49 \leq x \leq 0.52$ and $0.16 \leq y \leq 0.19$, respectively.

3. The ceramic of claim 1, wherein in the general formula (I) the Zn content in the A is not less than 0.29y.

4. The ceramic of claim 1, wherein The degree of order of said compound of the general formula (I) is 0.25 or less.

5. A process producing a diellectric ceramic as claimed in claim 1, comprising the steps of:
   calcining a mixture of compounds selected from the group consisting of oxides and compounds of the metals constituting said compound of the general formula (I) which are converted into oxides under the heating conditions of this calcining step or the firing step below, at a temperature of from 1,000 to 1,400° C., and
   firing by heating the calcined product at a rate of from 100° C. to 1,600° C./min. up to the order-disorder transition temperature of said compound of the general formula (I) or above, and maintaining the calcined product at the temperature for at least 2 minutes.

TABLE 3

| Test Sample No | Composition x Ba | y Zn | Mg | Co | Ni | 1-x-y Ta | Nb | Heat-treating temp °C | Time min | $\epsilon_r$ | Qu × $10^2$ | $\tau f$ ppm/°C |
|---|---|---|---|---|---|---|---|---|---|---|---|---|
| 301 | 0.5 | 0.07 | 0.06 | 0.02 | 0.02 | 0.25 | 0.08 | 1400 | 5 | 30 | 190 | 4 |
| 302 | 0.5 | 0.07 | 0.06 | 0.02 | 0.02 | 0.25 | 0.08 | 1400 | 60 | 29 | 185 | 2 |
| 303 | 0.5 | 0.07 | 0.06 | 0.02 | 0.02 | 0.25 | 0.08 | 1400 | 240 | 28 | 170 | 1 |
| 304 | 0.5 | 0.05 | 0.06 | 0.03 | 0.03 | 0.23 | 0.10 | 1400 | 5 | 29 | 170 | 3 |
| 305 | 0.5 | 0.05 | 0.06 | 0.03 | 0.03 | 0.23 | 0.10 | 1400 | 60 | 28 | 170 | 1 |
| 306 | 0.5 | 0.05 | 0.06 | 0.03 | 0.03 | 0.23 | 0.10 | 1400 | 240 | 27 | 165 | −1 |

We claim:

1. A dielectric ceramic essentially consisting of a compound having a disordered perovskite-type com- 6. The process of claim 5, wherein said calcined product is heated up to a temperature of said order-disorder transition temperature or above and with in the range from 1,500 to 1,700° C., and maintained at said temperature for 2 minutes to 1 hours.

* * * * *